(12) United States Patent
Jung

(10) Patent No.: US 6,659,477 B2
(45) Date of Patent: Dec. 9, 2003

(54) GOLF BAG WITH DETACHABLE WHEELS

(76) Inventor: Man Young Jung, 4918 Oceanview Blvd., La Canada, CA (US) 91011

( * ) Notice: Subject to any disclaimer, the term of this patent is extended or adjusted under 35 U.S.C. 154(b) by 0 days.

(21) Appl. No.: 10/001,167

(22) Filed: Dec. 1, 2001

(65) Prior Publication Data

US 2003/0102643 A1 Jun. 5, 2003

(51) Int. Cl.$^7$ ................................................ B62B 1/04
(52) U.S. Cl. ...................... 280/47.26; 280/645; 248/96; 206/315.3
(58) Field of Search ........................ 280/DIG. 6, 47.26, 280/47.24, 47.131, 645, 63, 64; D21/796; D3/255; 248/96, 97, 98; D34/15; 206/315.5, 315.6, 315.3, 315.7

(56) References Cited

U.S. PATENT DOCUMENTS

| | | | | |
|---|---|---|---|---|
| 1,325,692 A | * | 12/1919 | Cross | 206/315.4 |
| 1,570,500 A | * | 1/1926 | Kennedy | 206/315.6 |
| 2,023,792 A | * | 12/1935 | Sampson | 206/315.4 |
| 4,245,684 A | * | 1/1981 | Street et al. | 206/315.4 |
| 4,767,001 A | * | 8/1988 | Kim | 206/315.3 |
| 4,796,789 A | * | 1/1989 | Willcocks | 224/581 |
| 4,858,761 A | * | 8/1989 | Fumia | 206/315.3 |
| 4,915,221 A | * | 4/1990 | Spangler | 206/315.6 |
| 5,074,576 A | * | 12/1991 | Finlay | 280/645 |
| 5,168,992 A | * | 12/1992 | Bowdy | 206/315.6 |
| 5,415,284 A | * | 5/1995 | King | 206/315.6 |
| 5,478,097 A | * | 12/1995 | Forma | 280/47.26 |
| 5,582,290 A | * | 12/1996 | McCuaig et al. | 206/315.6 |

* cited by examiner

Primary Examiner—Brian L. Johnson
Assistant Examiner—Brian L. Swenson
(74) Attorney, Agent, or Firm—Clement Cheng

(57) ABSTRACT

A semi rigid golf bag having a hollow cylindrical main section, a plurality of storage compartments for golf equipment. The main section is formed from two semicircular half sections having semi-rigid walls attached by hinges to allow a user to open the main section to access the storage compartments. There are two insertion slots formed in the cylindrical main section, an insertion slot capable of retaining a cylindrical insertion bar when the insertion bar is inserted into the insertion slot; two wheel assemblies, each wheel assembly having a wheel attached to metal tube, the tube having an open end capable of receiving the insertion bar; an. outside circle and an inside circle defined concentrically on said top end of cylindrical main section. The circles define a golf club storage area and a second storage area for golf ball and glove storage.

20 Claims, 5 Drawing Sheets

GOLF BAG WITH DETACHABLE WHEELS

BACKGROUND

For golfers that prefer to walk, having to carry a golf bag for the duration of a game can be uncomfortable. Golfing equipment is heavy, and the design of golf bags is problematic because it limits golfers to carrying the golf bag on one shoulder, hence creating an asymmetrical load on the spine.

There is the option of using a golf cart, but golf carts tend to be structurally sturdy which translates to being bulky and heavy, and getting a golf cart in and out of the car can be an arduous task. Consequently, many golfers would rather leave their golf carts at home and rent a cart at the golf course. Unfortunately, renting a golf cart isn't the optimal choice either since it is costly.

A golf bag with detachable wheels alleviates the weight of a golf bag from the golfer onto the ground. With wheels attached to the golf bag, golfers no longer have to lug their golf bags. Instead, they can wheel their golf equipment while strolling along the golf course.

PRIOR ART

U.S. Pat. No.: 6,231,059 issued to Erwin Cheldin is a golf bag pull cart having integral extendable rollers and handle. The pull cart provides sturdy support for transporting a golf bag. However, as with most golf carts, its frame is heavy, and moreover, has unnecessary parts that add to the weight and awkwardness of the cart. There is a long pull handle and anchors on opposite sides of the cart. These two features reside along the golf bag when it is vertically placed. When the golf bag is tilted at an angle, the pull handle and the anchors would freely dangle, making it awkward to maneuver.

A golf bag of U.S. Pat. No. 6,299,183 issued to Nariie Kaneko. The design of this golf bag by Kaneko is efficient and uses a bare bone construction to get the golf bag wheeling. It is essentially a golf bag with wheels. The wheels on Kaneko's design are not detachable and delimit how the golf bag is carried. Carrying Kanebo's golf bag is likely to transfer dirt onto the carrier's clothes, then eventually to the car trunk.

OBJECT OF THE INVENTION

This invention is designed to assuage the burden of transporting golfing equipment for golfers. Overall, there are many advantages to have detachable wheels. (1) The golf bag unit fits easily into the car trunk. (2) The dirt gathered on the golf course is contained. (3) As the wheels wear out, they are easily replaceable. (4) The length of the insertion bar can vary upon the user's choice. By varying the length of the insertion bar, the angle at which the golf bag tilts differs and helps to accommodate golfers of different heights.

DESCRIPTION

The golf bag with detachable wheels by Man Jung is a design that stresses minimization and portability. It is important for a golf bag to be lightweight because its content is heavy. Any unnecessary features add to the weight of the overall unit. Portability is also important because golf bags are awkward to carry. Similarly, any unnecessary features add to the awkwardness of existing golf bags. By making the wheels on the golf bag detachable, the user is able to carry it in and out of the car with ease. The golf bag with detachable wheels is superior when compared to golf bags of existing designs.

This golf bag is designed to be an all-in-one unit. The shape of the golf bag is cylindrical and strategically compartmentalized for organization. It opens along its length into two semicircular sections. The hinges are located along the outer surface of the cylinder to allow the two half-sections to swing open and close.

The wheels are detachable and are stored inside special compartments in the golf bag. There are no external loose components to avoid loss or forgotten parts during transport. When the wheels are detached from the golf bag, Jung's design is as portable as a regular golf bag. By making the wheels detachable, dirt drawn to wheels stay within the designated wheel compartment of the golf bag.

The material of the golf bag is preferably polyethylene, glossed over with resin so that it is waterproof. The material is semi-rigid so that the golf bag retains its shape and can be wheeled at an angle to the horizontal. A semi-rigid material is also preferred because flight carriers have began to withdraw insurance coverage on golf clubs damaged while being transported unless protected by a hard shell protective case. This golf bag also doubles as a travel golf bag. A padded, stretchable cover can zip across the top of the golf bag. This cover keeps golf clubs and the inside of the golf bag from getting wet during unexpected rain. It also keeps the golf clubs from sliding out during transport. When the cover is not in use, it zips freely to be stored in the glove storage.

The following is a discussion of the preferred embodiment as shown in the figures.

Figure 1:
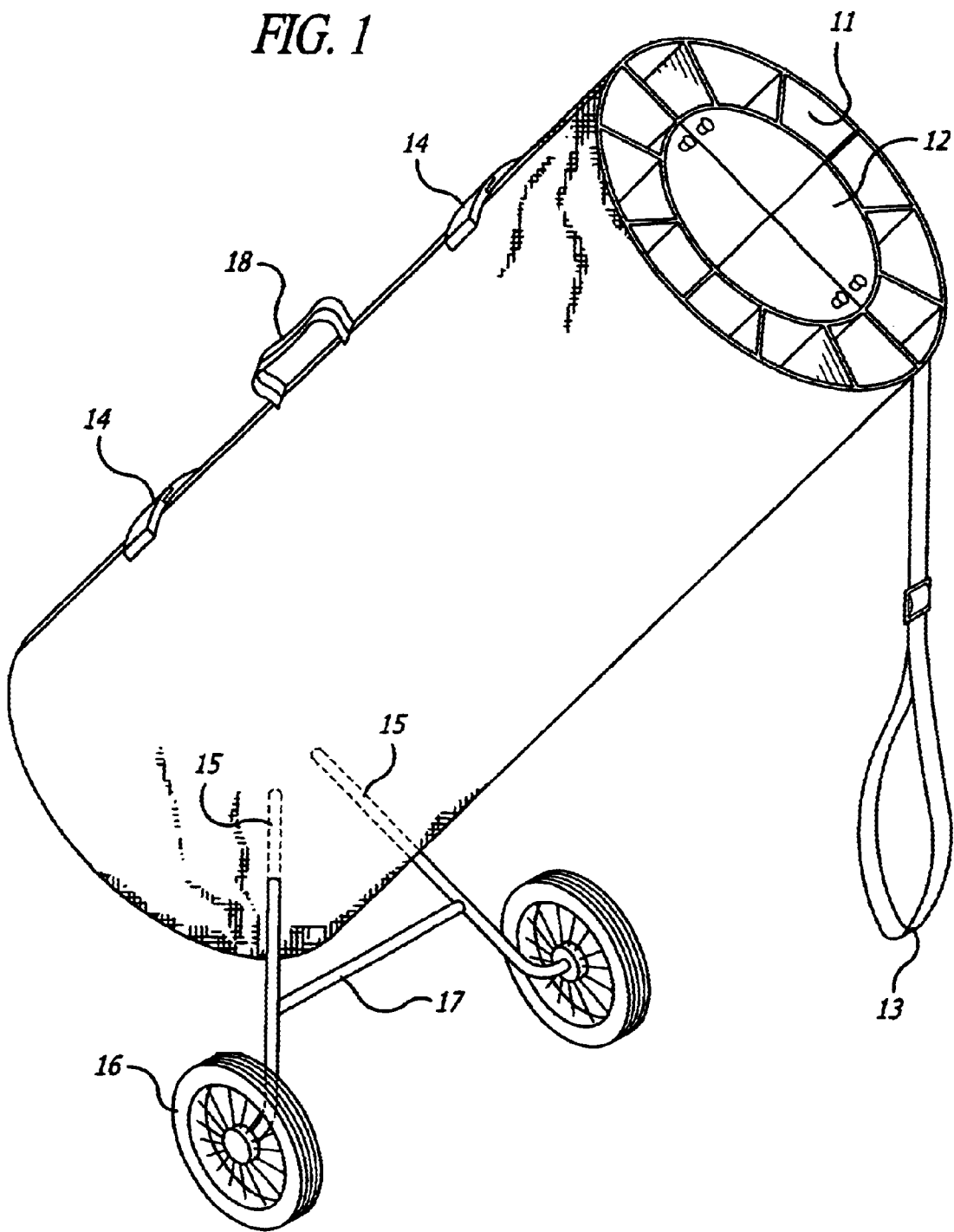
FIG. 1 is a perspective view of Golf Bag with Detachable Wheels

FIG. 1—Perspective View of Golf Bag with Detachable Wheels 1.1 Club Holders—The club holders lie along the outer circumferential part of the cylindrical golf bag. The golf bag main section is partitioned into full length shaft dividers to store golf clubs individually. The golf clubs are accessible from the top of the bag without opening the golf bag main section. The cross sectional view of the golf bag shows two concentric circles. The club holders occupy the outer of the two concentric circles.

1.2 Ball & Glove Storage—The ball and glove storage is used to store golf balls and gloves. It is one of the four storage compartments that occupy the inner concentric circle. Since the golf bag opens into two semi-cylinders, the compartments inside follow the same trend. The bali and glove storage is sectioned into two semi-cylinders, but form a cylinder when the golf bag is closed. Each semi-circle is covered with its respective lid. The doors open upward and are kept in place with a spring catch knob or similar latching device. It has a height that accommodates the diameter of a golf ball. It is located at the top most part of the inner circle, hence it is accessible when the golf bag is closed. The ball and glove storage is above the clothing storage and is circumscribed by the club holders.

1.3 Pull/Shoulder Strap—The pull strap has an adjustable length and is edge trimmed for a smooth grip. It is secured to the surface of the cylindrical portion at the top end of the golf bag. It is used to pull and direct the golf bag (when on wheels). The free end of the strap attaches to the lower end of the golf bag main section to serve as a shoulder strap. The golf bag can then be carded across the shoulder like a conventional golf bag. The golf bag is designed to have mirror image compartments so that the weight of the golf bag is equally distributed among the two half-sections. To avoid wobbling of the whole unit, the pull/shoulder strap is located along the diameter that divides the two half-sections. It faces away from the line of opening, and bisects the angle between the detachable wheels.

1.4 Latches—Each latch is composed of two components; each component is mounted to its corresponding half section. The latches are used to fasten the golf bag. There are at best two latches mounted along the opening length of the golf bag. One latch is located at one-fourth of the length and the other at three-fourth. Each latch provides an option for a locking device.

1.5 Detachable Wheel Insertion Slots—(refer to 4.3)

1.6 Wheels—(refer to 4.1)

1.7 Support Bar—The support bar is straight and hollow. The ends of the support bar are bracketed onto the midpoint proximity of the detachable wheel insertion bars. The support bar stabilizes and supports the weight distribution of the golf bag among the axles (i.e. the detachable wheel insertion bar). The support bar is optional and detachable. When bracketed onto the detachable wheel insertion bars, it forms a truss structure for greater rigidity on rough terrain.

1.8 Handles—The main section handle is semi-rigid, but it is padded for a comfortable grip. It is used to hand carrying the golf bag laterally. The handle is mounted on both sides of the opening edges, and is centered along the length of the golf bag.

Figure 2:
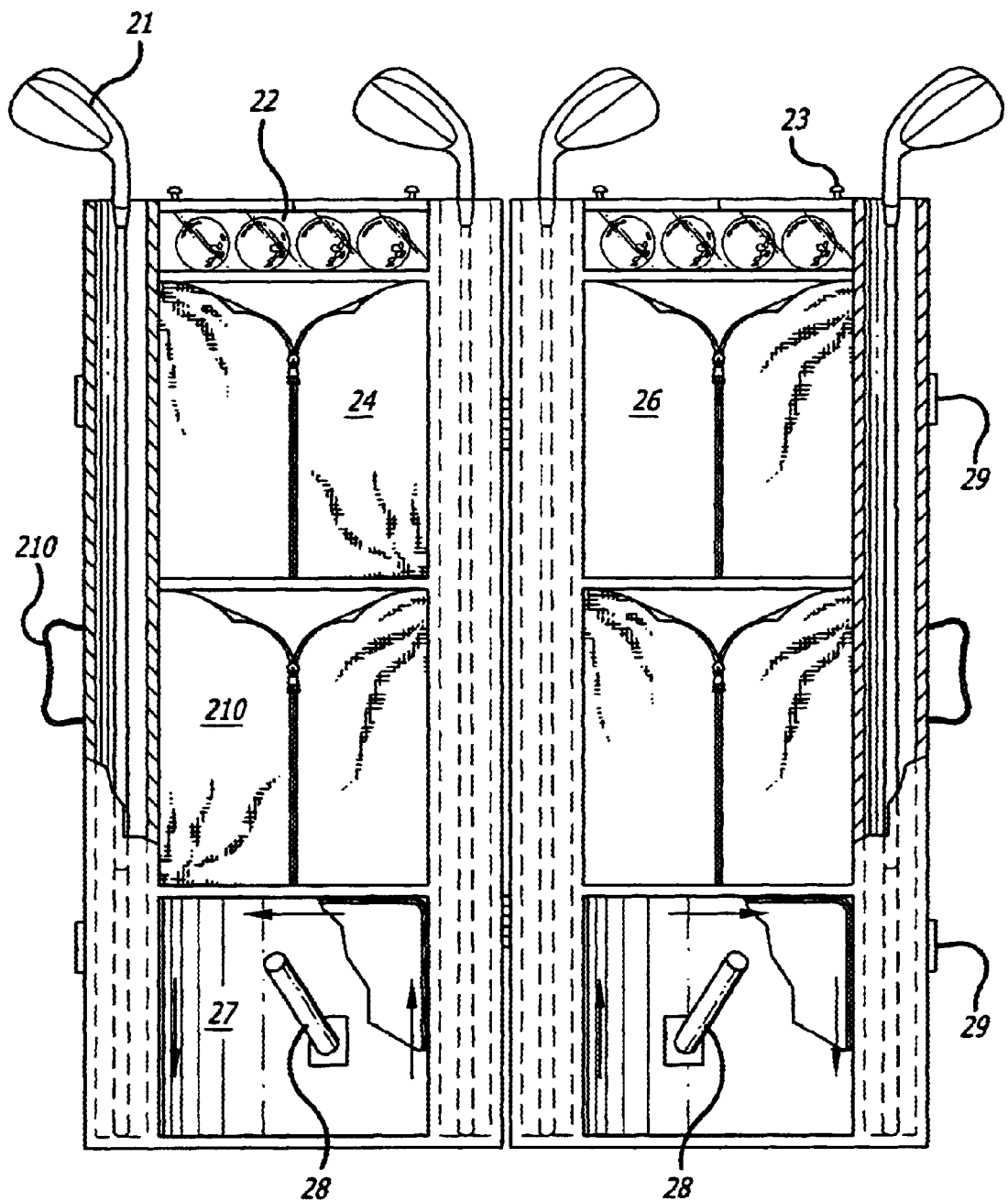
FIG. 2 is a sectional view of Golf Bag showing a mirror image view

FIG. 2—Sectional View of Golf Bag (Mirror Image) 2.1 Club Holders—(refer to 1.1)

2.2 Ball & Glove Storage—(refer to 1.2)

2.3 Spring Catch Knobs for Storage Lids—The spring catch knob is a fastener that uses a spring to control its locking movement. It consists of two components (viz, the knob and the catch) that collaborate to restrain the opening and closing movements of the storage lid. The knob is mounted onto the lid and the catch is mounted onto the inner wall of the inner concentric cylinder in a conjugate manner with the knob. The knob turns to compress the spring and returns to restore the spring to its natural length. The spring controls the movement of the latch that fits into the catch. When the spring is compressed, the latch fits away from the catch, and the lid is free to move. Conversely, the latch fits into the catch when the spring is uncompressed, hence restrains the storage lid from opening. The spring catch is used to keep the lids from opening (to prevent the golf balls from rolling out) during transit, as the golf bag isn't always upright.

2.4 Clothing Storage—The clothing storage is used to store golf attires. It is the second (from top down) of the four storage areas occupying the inner cylinder. The clothing storage is sectioned into two semi-cylinders. Each semi-cylindrical storage space is sealed off with a mesh/nylon cover. A zipper, centered along the mesh/nylon cover is directed longitudinally to dictate the access to the storage space. The clothing storage space is sealed off to keep clothes from falling out when the golf bag opens. This storage space is only accessible when the golf bag is opened. It sits below the ball and glove storage and above the shoe storage, circumscribed by the club holders.

2.5 Shoe Storage—The shoe storage is the third (from top down) of the four storage areas occupying the inner cylinder. It is the same as the clothing storage other than its purpose, which is to store shoes. It is enclosed with a mesh cover to allow the shoes to breathe. There is a zipper centered in the mesh cover that functions longitudinally. The shoe storage is only accessible when the golf bag is opened. It sits below the clothing storage and above the wheel storage, circumscribed by the club holders.

2.6 Zipper—The zipper(s) is used in various storage areas—clothing, shoes, and wheel. Using a zipper closing compartment allows retention of stored articles.

2.7 Wheel Storage—The wheel storage is the fourth (from top down) of the four storage areas occupying the inner cylinder. The semi-cylindrical wheel storage is sealed off with nylon cover. The cover should be a solid material to isolate the dirt gathered by the detachable wheel components. The wheel storage is used to store the detachable wheel and insertion bar. One semi-cylinder accommodates one side of the detachable wheel component. In a first embodiment the support bar fits in the wheel storage area defined in the lower portion of the golf bag housing. In a second embodiment, the support bar is shaped to fit into the club holder area. The direction of the zipper in the wheel storage differs from the clothing and shoe storage. Since the wheel and the insertion bar are rigid, the nylon cover unzips in three sides to provide an open space for easy access. The direction of the zipper is illustrated in FIG. 2. The wheel storage is ground-most level of all storage spaces. It sits immediately below the shoe storage, and circumscribed by the club holders. It is accessible only when the golf bag is opened. In addition, the wheel storage houses the detachable wheel insertion slots.

2.8 Detachable Wheel Insertion Slots—(refer to 4.3)

2.9 Latches—(refer to 1.4)

2.10 Handles—(refer to 1.8)

Figure 3:
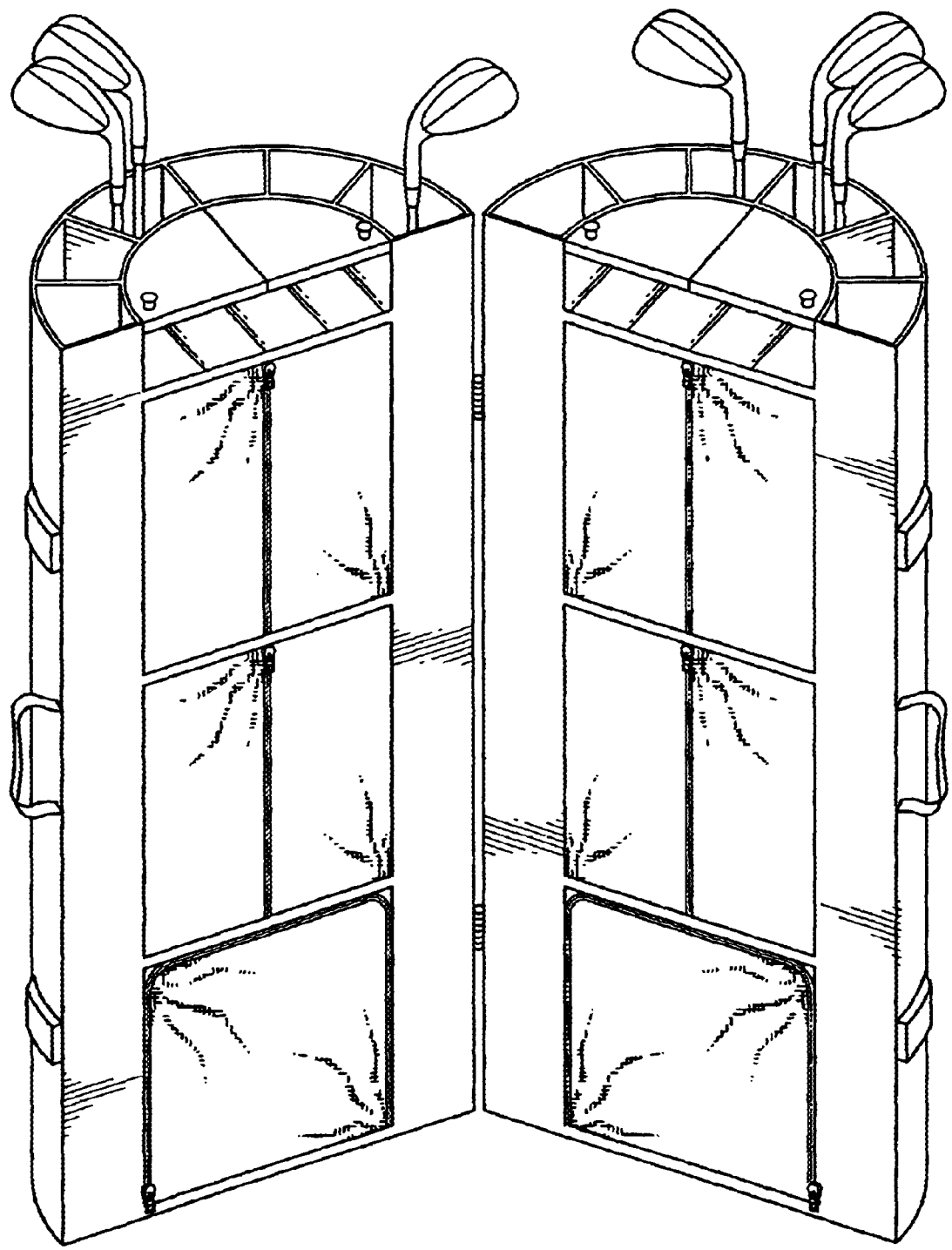
FIG. 3 is a perspective view of partly open golf bag.

FIG. 3—Perspective View of Partly Open Golf Bag

The partly open bag shows the spatial relationship between the two halves of the cylindrical main section.

Figure 4:
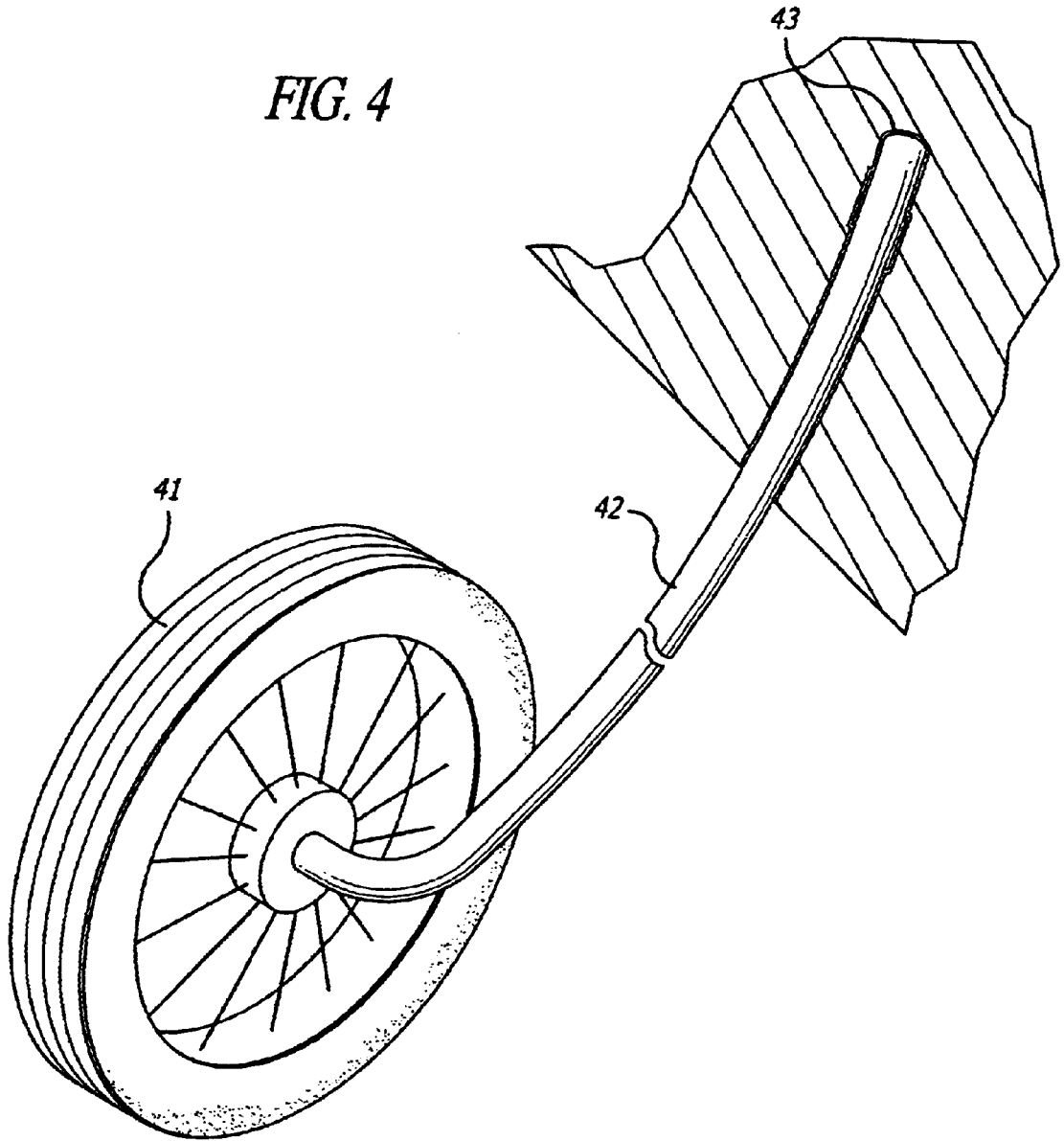
FIG. 4 is a diagram of the detachable wheel component.
Figure 5:
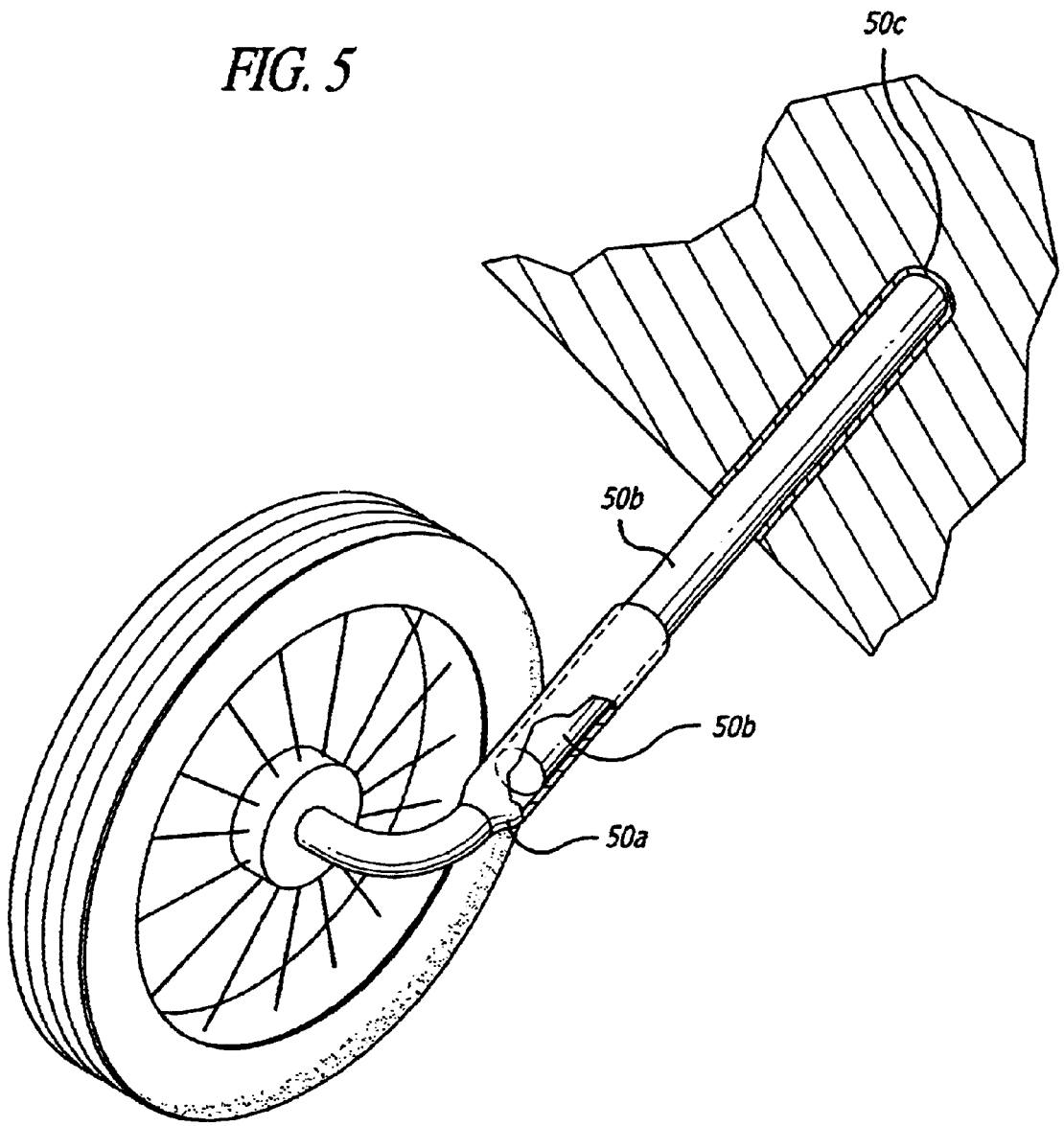
FIG. 5 is a diagram of the quick fix carrying wheel embodiment.

FIG. 4—Detachable Wheel Component 4.1 Wheels—The wheels have rubber tires and spokes to support and retain its weight and shape. In a first embodiment the diameter of the wheel is less than the radius of the golf bag so that the wheels can easily fit inside each half of the golf bag. The wheels are used to transport the golf bag. Here, the wheels can swivel about an axle rotatable about a parametric axle. The wheel portion of the detachable wheel component is connected to the detachable insertion bar, which is secured to the body of the golf bag.

In a second wheel embodiment, also called the 'large wheel embodiment', the wheel diameter is slightly smaller than the diameter of the golf bag so the wheels fit snugly into disk shaped wheel holding cavities formed in the lower portion of the golf bag. The second embodiment allows a snugly efficient fit of the circular wheels into cylindrical wheel holding cavities.

4.2 Detachable Wheel Insertion Bars—The insertion bar is hollow and has an outward bend to its shape. The lower end of the bar is almost horizontal and functions as an axle for the wheel. The upper end of the insertion bar is almost vertical. There is a notch along the length of the insertion bar. The notch is located in the upper end where it frictionally fits into inverse notch of the insertion slot.

4.3 Detachable Wheel Insertion Slot—The slots are symmetrical about the diameter that divides the golf bag. The slots have a finite length and width that fit about the insertion bar. There is a shallow, inversed notch along the path of each slot that matches the notch of the insertion bars. The notch helps to secure the detachable wheel component using friction fit. The insertion slots protrude into the wheel storage area to secure the detachable wheel component to the body of the golf bag.

5.0 Quick Fix Carry Wheel Embodiment: A second embodiment of the Detachable Wheel comprises a detachable wheel insertion bar B, inserted into a wheel insertion bar holder C and a wheel end A. The insertion bar holder located on the golf bag main section is also called a quick fix lodging slot.

The primary difference between the Quick Fix Carry Wheel Embodiment and the Detachable modes as listed above is that the Quick Fix version has a wheel permanently attached to a wheel axle and a hollow wheel support. The hollow portion of the wheel support allows a wheel insertion bar B to be inserted in a friction fit into end A and end C. This wheel assembly allows a wheel a strong bearing to accommodate a larger load. The quick fix embodiment is believed to be a greater load-carrying embodiment due to its ease of implementation with hollow tubes.

What is claimed is:

1. A golf bag comprising:
   a) a substantially hollow cylindrical main section having a bottom end, a top end, and a plurality of storage compartments for golf equipment formed within the substantially hollow cylindrical main section, wherein said main section is formed from two semicircular half sections having semi-rigid walls attached by hinges to allow a user to open the main section to access said storage compartments;
   b) two insertion slots formed in said cylindrical main section, an insertion slot capable of retaining a cylindrical insertion bar when said insertion bar is inserted into said insertion slot;
   c) two detachable wheel assemblies, each detachable wheel assembly having a wheel attached to metal hollow tube, said tube having an open end capable of receiving said insertion bar;
   d) an outside circle and an inside circle defined concentrically on said top end of cylindrical main section, wherein said concentric circles define two storage areas, wherein a first storage area for golf clubs defined between the outside circle and the inside circle, said first storage area sectioned to store golf clubs individually, wherein a second storage area is defined in the inside circle for ball and glove storage, said ball and glove storage area having a lid and formed deep enough to receive a plurality of golf balls.

2. The golf bag of claim 1, wherein a friction fit retains said insertion bar.

3. The golf bag of claim 1, wherein a supporting bar connects the two wheel assemblies for additional mechanical strength.

4. The golf bag of claim 1, further comprising latches to keep the main section closed, and further comprising a handle located on the main section.

5. The golf bag in claim 1, wherein a third storage compartment for the detachable wheels is shaped to retain and protect said wheels to tightly fit within said storage compartment.

6. The golf bag in claim 1, wherein said detachable wheels may be stored in a storage compartment of said plurality of storage compartments.

7. The golf bag in claim 1, wherein each said detachable wheel may be individually stored in a storage compartment of said plurality of storage compartments.

8. A golf bag comprising:
   a) a substantially hollow cylindrical main section having a bottom end, a top end, and a plurality of storage compartments for golf equipment formed within the substantially hollow cylindrical main section wherein said main section is formed from two semicircular half sections having semi-rigid walls attached by hinges to allow a user to open the main section to access and maximize the use of said storage compartments, wherein the hollow main section forms three storage compartments, a first storage compartment for clothes, a second, storage compartment for shoes and a third storage compartment for wheels of the golf bag said storage compartments enclosed by cloth when said hollow main section is open, said storage compartments accessible by opening a zipper stitched in the cloth;
   b) two insertion slots formed in said cylindrical main section, an insertion slot capable of retaining a cylindrical insertion bar when said insertion bar is inserted into said insertion slot;
   c) two detachable wheel assemblies, each detachable wheel assembly having a wheel attached to metal hollow tube, said tube having an open end capable of receiving said insertion bar;
   d) an outside circle and an inside circle defined concentrically on said top end of cylindrical main section wherein said concentric circles define two storage areas, wherein a first storage area for golf clubs defined between the outside circle and the inside circle, said first storage area sectioned to store golf clubs individually, wherein a second storage area is defined inside in the inside circle for ball and glove storage, said ball and glove storage area having a lid and formed deep enough to receive a plurality of golf balls.

9. The golf bag of claim 8, wherein a friction fit retains said insertion bar.

10. The golf bag of claim 8, wherein a supporting bar connects the two wheel assemblies for additional mechanical strength.

11. The golf bag of claim 8, further comprising latches to keep the main section closed, and further comprising a handle located on the main section.

12. The golf bag in claim 8, wherein said third storage compartment for the detachable wheels is shaped to retain and protect said wheels to tightly fit within said storage compartment.

13. The golf bag in claim 8, wherein each said detachable wheel may be individually stored in said third storage compartment.

14. A golf ball comprising:
   a) a substantially hollow cylindrical main section having a bottom end, a top end, and a plurality of storage compartments for golf equipment formed within the substantially hollow cylindrical main section, wherein said main section is formed from two semicircular half sections having semi-rigid walls attached by hinges to allow a user to open the main section to access and maximize the use of said storage compartments;
   b) two detachable wheel assemblies, each detachable wheel assembly having a wheel attached to metal protrusion called a wheel insertion bar;
   c) two insertion slots formed in said cylindrical main section, each insertion slot capable of retaining the metal protrusion portion of a wheel assembly when said metal protrusion is inserted into said insertion slot;

d) an outside circle and an inside circle defined concentrically on said top end of cylindrical main section, wherein said concentric circles define two storage areas, wherein a first storage area for golf clubs defined between the outside circle and the inside circle, said first storage area sectioned to store golf clubs individually, wherein a second storage area is defined inside the inside circle for ball and glove storage, said ball and glove storage area having a lid and formed deep enough to receive a plurality of golf balls.

15. The golf bag of claim 14, wherein a friction fit retains said insertion bar.

16. The golf bag of claim 14, wherein a supporting bar connects the two wheel assemblies for additional mechanical strength.

17. The golf bag of claim 14, further comprising latches to keep the main section closed, and further comprising a handle located on the main section.

18. The golf bag in claim 14, wherein a third storage compartment for the detachable wheels is shaped to retain and protect said wheels to tightly fit within said storage compartment.

19. The golf bag in claim 14, wherein said detachable wheels may be stored in a storage in a storage compartment of said plurality of storage compartments.

20. The golf bag in claim 14, wherein each said detachable wheel may be individually stored in a storage compartment of said plurality of storage compartments.

* * * * *